Figure 1:
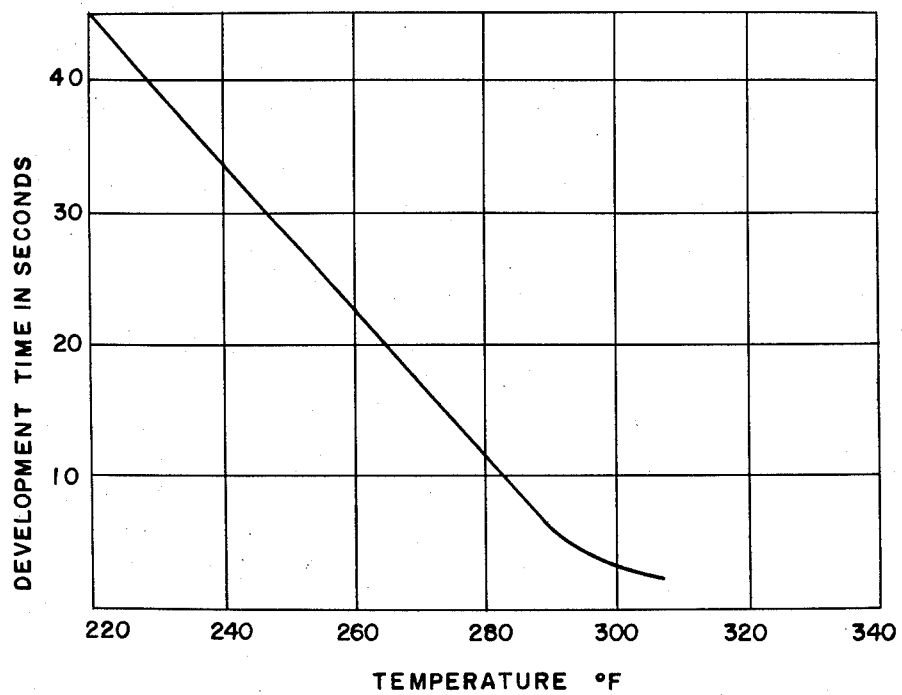

3,081,169
SCATTER PHOTOGRAPHY ELEMENT CONTAINING WERNER TYPE CHROME CARBOXYLIC ACID COMPLEXES

Rienzi B. Parker, Jr., Concord, and Peter A. Reiman, Weston, Mass., assignors, by mesne assignments, to Kalvar Corporation, New Orleans, La., a corporation of Louisiana
Filed Jan. 23, 1958, Ser. No. 710,737
17 Claims. (Cl. 96—75)

The present invention relates to novel photographic materials and methods of preparing and using same. More particularly, the invention is concerned with unique improvements in scatter photography.

Scatter photography is based on the concept of establishing a record in terms of light scattering centers formed in a suitable vehicle according to an image pattern. Essentially, the optical effect is created by a difference in the refractive indices of the component phases of the record which causes light scattering in the exposed areas whereas the unexposed areas transmit essentially all of the light incident thereto. For example, a scatter record within a normally transparent self-supporting vehicle appears dark in transmitted light, whereas the same record appears light if viewed with reflected light. In the first case, the record subtracts by scattering from the transmitted light, and in the latter case it scatters light back to the observer while the light transmitted through the non-scattering portions is either absorbed in a dark backing or lost beyond the support.

It has previously been proposed to prepare a scatter record by exposing and heat developing a photographic element comprising a vehicle or film of a hydrophilic colloid, e.g., gelatin, in which a photolytic, i.e. light sensitive, compound such as a diazonium salt is dispersed. Procedures of this type are described in the co-pending application of Baril et al., Serial No. 300,282, filed July 22, 1952.

By exposing or irradiating a photographic element of this type, the photolytic compound is decomposed or otherwise modified according to an image pattern and the desired light scattering centers are developed by heating the irradiated element. In the case where the photolytic compound is a diazonium salt, exposure brings about decomposition of the salt in the exposed areas, apparently with the liberation of nitrogen. The application of heat to the exposed element then causes the nitrogen which has been liberated to expand and create the desired light scattering centers in the form of bubbles, cavities, disruptions or other rearrangement of the crystalline structure of the colloid. The exact chemical and/or physical phenomena accompanying exposure and heat development of such a scatter photography element including, for example, decomposition of the photolytic compound to generate nitrogen or other gas, and the transition of such gas into an optically effective disruption of the initial structure of the vehicle or film are not fully understood. Nevertheless, it is clear that the resultant discontinuity of the vehicle brings about the scattering of light on a microscopic scale at scattering centers as distinguished from the separate light absorbing media of other photographic techniques.

Among the materials which have been suggested for use as vehicles in photographic materials of the type described above, there may be mentioned certain hydrophilic natural and synthetic colloids such as gelatin, zein and polyvinyl alcohol. These colloids possess a number of properties which make them highly desirable for use as vehicles in the preparation of material useful in scatter photography. However, due to their hydrophilic nature, these materials are necessarily sensitive to moisture. As a result, scatter records obtained therefrom, while otherwise satisfactory, may be affected by conditions of high humidity and elevated temperature and may not be stable or permanent under such conditions. Furthermore, the degree of permanence of such records cannot be improved by conventional treatments, such as tanning, for while this may give a completely insolubilized vehicle, the latter still remains sufficiently sensitive to heat and/or moisture to affect the stability of the record on storage. Additionally, many of the better known tanning agents are not satisfactorily compatible with the best photolytic compounds.

The principal object of the present invention is to provide novel methods and compositions for scatter photography using normally hydrophilic colloids as the vehicle or film while avoiding the above-mentioned difficulties. A more specific object is to provide methods and compositions whereby a scatter record is obtained having a highly improved stability and permanence even under conditions of extreme humidity and temperature.

Other objects of the invention include the provision of:
(a) Unique methods of making materials suitable for use in scatter photography;
(b) Scatter records of optimum permanence and quality;
(c) Materials for use in scatter photography which can be satisfactorily stored, both before and after exposure and development, under severe conditions of humidity and temperature.

The manner in which the above and other objects are realized will be more fully appreciated from the following detailed description of the invention.

Broadly stated, photographic material, capable of use in the preparation of a scatter record, according to the invention, comprises a film (i.e., supported or unsupported) of an organic normally hydrophilic colloid having a pH not in excess of about 5, a photolytic compound capable of forming light scattering centers in such colloid according to an image pattern on exposure and development and a chrome carboxylic acid complex of the Werner type.

The photographic materials of the invention may be prepared by a process involving the following steps: (1) adjusting the pH of the hydrophilic colloid, such as gelatin to not greater than about 5; (2) mixing the thus treated colloid with a diazonium salt or other photolytic compound; and (3) compounding the resulting mixture with the chrome carboxylic acid complex of the Werner type. The compounded material can be coated onto any suitable support, e.g., cellulose acetate, glass, paper, polyethylene terephthalate (Mylar) and the like, and dried. Preferably, the drying operation is carried out with moving air at an elevated temperature, e.g., 40 to 80° C. The thickness of the coating can be widely varied although, generally speaking, the thickness of the dried layer should be between .0005 and .002 inch, preferably about .001 inch.

The success of the invention is due, at least to a large extent, in the use of the Werner type chrome complex in the manner described herein. The exact manner in which the complex functions is not understood. However, it is believed that the complex reacts with the colloid during the application of the development heat to bring about the formation of an irreversibly cured, thermoset structure comprising a reaction product of the complex and the colloid wherein the entire structure is bound together in three dimensions by chemical valence forces. The chrome complex is not only capable of complexing with polar groups located on the chain molecules of the colloid, but it also can react with itself, upon heating, through hydrolysis and subsequent polymerization, to form large molecular aggregates bound together by primary valence forces. Whatever the reactions may be, it is readily apparent that photographic records prepared according to the invention show remarkable durability, as evidenced by the fact that they are capable of withstanding immersion in boiling water for five minutes with little if any loss in optical density.

The chrome complexes suitable for the purposes of this invention may be characterized as complex compounds of the Werner type in which a divalent nuclear chromic atom is coordinated with a carboxylic acid group of the type:

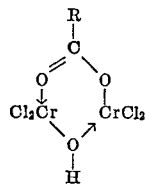

wherein R is selected from alkyl and aralkyl containing from one to 20 carbons in the alkyl group, and halogenated hydrocarbons. For example, R may be methyl, ethyl, propyl, butyl, stearyl, benzyl, and in addition many larger radicals as when the chrome complex is desired from the following acids: Lauric acid, oleic acid, stearic acid, palmitic acid.

As typically suitable compounds there may be specifically mentioned chrome complexes which are derived from stearic acid, oleic acid, palmitic acid, linolenic acid, valeric acid, benzoic acid and trichloroacetic acid.

Complex compounds of this type are described in United States Patent No. 2,273,040, of February 17, 1942. These compounds are known to possess waterproofing characteristics due to the affinity of the active end of the molecule for polar groups such as the hydroxyl group, or the carboxyl group, whereas the non polar or organic portion of the molecule is oriented away from the surface, resulting in a water repellant coating. It is clear, however, that the success of the present invention is not dependent upon this waterproofing aspect, but upon a chemical reaction between the complex and colloid whereby the complex becomes an integral part of the vehicle structure.

The amount of chrome complex utilized according to the present invention is dependent upon various factors, particularly the nature of the colloid vehicle. It has been found that the amount of fading in the scatter record under conditions of elevated temperature and humidity (e.g., 150° F., 95% relative humidity) is dependent upon the amount of chrome complex present. The most effective results are obtained when using, by weight, between about 0.5 and 3 parts of the complex for each 10 parts of the dry colloid.

For the purposes of the invention, any photolytic material capable of forming light scattering centers in the colloid, upon exposure and development, may be used. Preferably, but not necessarily, the photolytic material is a diazo compound, e.g., a diazonium salt, which decomposes with the formation of nitrogen gas upon irradiation. As particularly suitable diazonium compounds, there may be mentioned p-N,N-dimethylamino-benzenediazonium zinc chloride and 1-dimethyl-amino-4-naphthalenediazonium fluoborate. Other suitable photolytic compounds are the following:

p-Anilinobenzenediazonium sulfate
p-N,N-diethylaminobenzenediazonium zinc chloride
p-(N-ethyl-N-methylamino) benzene diazonium zinc chloride
4-diazo-3-oxynaphthalene sulfonic acid
4-N,N-diethylamino-5-methylbenzenediazonium chloride Compounds which liberate carbon dioxide upon irradiation may also be used, e.g., salts of oxalic or citric acid, such as ferric ammonium citrate.

The amount of diazonium compound or the like utilized for preparing the present materials can be varied. Generally speaking, however, satisfactory results are obtained by using about 0.5 to 1.5 parts, by weight, of the photosensitive compound for each 10 parts of the dry colloid.

In preparing the compositions of the invention, it is preferred to use an aqueous solution of the gelatin or other colloid. Desirably, such solution comprises, by weight, 50 to 70 parts water per 10 parts of the dry colloid. However, it will be appreciated that proportions outside this range can be used.

The life of the colloid solution is dependent upon its pH, a lower pH being favorable to longer pot life. On the other hand, too low a pH may necessitate a longer heat treatment to effect completion of the curing and image development. Desirable results are obtained if the pH of the solution does not exceed a maximum of about 5 with pH values of 2.5 to 3 preferred.

It is also preferable to adjust the pH of the colloid solution with a mineral acid, e.g., hydrochloric, sulphuric, nitric or phosphoric, rather than a carboxylic acid. Carboxylic acids may be used, but in large amounts they tend to inhibit curing to some extent.

The chrome complex is preferably added in the form of an aqueous alcoholic solution to the colloid after the indicated pH adjustment. An ethanolic, propanolic or other alcoholic solution of the complex may be used. The concentration of such alcoholic solution can be widely varied but a concentration in the range of 10 to 40%, by weight, e.g., 30%, is preferred. Solvents other than the lower aliphatic alcohols may be used as long as they are compatible with the colloid solution.

According to another aspect of the invention, it has been discovered that the addition of a thermosetting, water-soluble, partially condensed urea-formaldehyde resin, to the colloid-complex composition further improves the permanence and other characteristics of the scatter record obtained therefrom. The urea-formaldehyde resin may be compounded with the colloid and complex in any convenient fashion. The amount of resin can be varied, but preferably about 0.1 to .75 part, by weight, of resin, per 10 parts of dry colloid, are used. One satisfactory way of incorporating the resin is in the form of an aqueous solution thereof containing, for example, about 30 to 50% resin.

The invention is further illustrated, but not limited, by the following examples:

*Example I*

10 grams of 100 Bloom, type A, gelatin are dissolved in 50 cc. of distilled water at a temperature of 40° C. The pH is adjusted to 2.5 with dilute hydrochloric acid. To this dispersion are added 1 cc. glycerine, and 1 gram of p-N,N-dimethylamino-benzene-diazonium zinc chloride ("Sensitizer #8").

To this mixture are added 4.5 cc. of a 30% solution of stearato chromic chloride (available as "Quilon"), in isopropanol.

The resulting solution is coated on a cellulose acetate film (.005 inch thick) to a thickness of about .006 inch. The coated film is dried by heat, for two to five minutes at about 120° F. under moving air.

The resulting film can be utilized in a variety of ways, either for making original records or for contact or projection copying of other records. For example, the film may be utilized to print microfilm records, the film being exposed to an original in direct contact therewith by means of ultraviolet light (G.E. 100 watt lamp, type AH4) in a continuous printer running at 10 feet per minute. The thus exposed film is developed by heating for about 3 to 4 seconds. Preferably, the developed record is fixed to prevent secondary development upon exposure to relatively intense radiation such as sunlight or the lamp of a viewer, by allowing the same to cool to room temperature (60–70° F.) and re-exposing the film without further heating. The record is then stored at 60 to 80° F. for about an hour to allow any gas formed by decomposition of the diazonium compound during re-exposure to escape to the atmosphere. The resulting record is then completely fixed and is substantially unaffected by moisture and heat, even when immersed in water at 120° F. for an hour.

*Example II*

The procedure of Example I is repeated, except that 1 cc. water-soluble, partially condensed urea-formaldehyde resin (available as "U-formite 711"), is also admixed with the gelatin. Upon exposure, development and fixation as described in Example I, a highly outstanding record, substantially unaffected by moisture and heat, is obtained.

*Example III*

The procedure of Example I is repeated, except that the glycerine is omitted, and the composition is coated on black paper. The resulting film gives an excellent, substantially permanent record on exposure and development.

*Example IV*

The coating composition of Example I is modified to the extent of including therein 0.5 gram colloidal silica. The resulting composition, coated on cellulose acetate and paper, gives an excellent film for preparing copies.

*Example V*

10 grams of polyvinyl alcohol (trade name "Elvanol") are dissolved by sprinkling into 50 cc. distilled water with continuous stirring. The resulting solution is brought to a pH of 3 with hydrochloric acid, and compounded with 1 gram p-N,N-dimethylaminobenzene diazonium zinc chloride, and 3.0 cc. of a 30% propanol solution of stearato chromic chloride as above described. The composition thus obtained is coated on cellulose acetate film, exposed, developed and fixed in the manner of Example I to give a highly satisfactory record.

*Example VI*

The procedure of Example I is repeated using, in one case, 4.5 cc. of a 30% propanol solution of laurylato chromic chloride and in another, 2.0 cc. of a 30% propanol solution of propionato chromic chloride in lieu of the stearato chromic compound. Substantially equivalent results are obtained therewith.

The beneficial effects of the various phases of the invention, including the feature of incorporating a urea-formaldehyde resin in the composition, are further illustrated by the following example.

*Example VII*

A film (film A) is prepared using the procedure outlined in Example I. Another film (film B) is prepared in the same manner, except that the complex chrome chloride is replaced by an equivalent amount of chrome alum. Film C is prepared in the manner of Example II so as to include 1% water-soluble, partially condensed, urea-formaldehyde resin while another film (film D) is compounded in the manner of Example II, except that the chrome complex is omitted. Films A to D are irradiated and developed according to the process of Example I. The resulting records are then tested for durability and permanence by immersing the same in water at 120° F. After about an hour of immersion, the quality of the films, in terms of percent light transmission through the originally dense scatter record, is as follows:

| | Percent |
|---|---|
| Film A (Example I) | 10 |
| Film B (chrome alum) | 85 |
| Film C (Example II) | 4 |
| Film D (urea-formaldehyde) | 55 |

In the above tests, the records faded to approach the given equilibrium values of light transmission under given conditions in about one hour. It is readily apparent that the quality of the records obtained in the films A and C, both of which are prepared according to the invention, is substantially better than the records obtained with urea-formaldehyde alone and chrome alum as evidenced by the substantially lower light transmission in the case of films A and C. The improvement effected by the use of a urea-formaldehyde resin in conjunction with the chrome complex is also evident from the difference in the degree of light transmission between films A and C.

The reason why the combination of Werner type chromium complex and formaldehyde resin gives the above-mentioned improvement is not understood. In the case where urea-formaldehyde resin alone is used, the formaldehyde seems to react with the diazo compound thus rendering the light-sensitive material ineffective and reducing the speed of the film. In the presence of the Werner complex, however, the urea-formaldehyde resin has no effect on the sensitizer, presumably because the formaldehyde reacts preferentially with the Werner complex. This is probably one of the reasons for the improved effect obtained with the combination of complex and resin although there are undoubtedly other factors which bring about this highly unusual result.

There are other advantages in using both the urea-formaldehyde and Werner type complex which emphasize the unexpected nature of this aspect of the invention. For one thing, gelatin or like vehicles containing only formaldehyde resin tend to assume a brownish cast on exposure or development. No such browning of the vehicle occurs when the resin is used with the complex. Additionally, it has been found that the use of a formaldehyde resin as described herein substantially improves the keeping, exposure, and development qualities of the present products and the image stability obtained therefrom. This has the further beneficial effect that the coatings do not require a glycol plasticizer, or at most only a very small amount thereof, in order to assure proper development of film that has been stored for a relatively long time, at zero percent relative humidity. Due to their humectant properties, glycols tend to impart a tackiness to the film and generally increase the effect of humidity thereon. Hence, it is desirable to be able to decrease the amount of glycol used or eliminate it entirely. One other disadvantage in the use of a glycol is that if the films are wetted, the glycol washes out, leaving behind a brittle coating. The fact that the Werner complex compound, especially in conjunction with the urea-formaldehyde resin, can effectively plasticize the gelatin over a broad range of humidities, affirms the conclusion that there is an unexpected reaction between the chrome complex molecule and gelatin and the urea-formaldehyde resin, if used, which results in a weakening of the bonding forces between the gelatin molecules, thus promoting the desired structural change, and the formation of a high quality scatter record.

It will be appreciated from the preceding examples that various other materials may be included in the coatings and films of the present invention. Glycols, e.g., ethylene glycol, may be included although, as indicated, the ability to avoid using same represents a desirable aspect of the invention. Other conventional plasticizers or the like may be added. Silica or equivalent finely dispersible materials may be included for the purpose of improving nucleation and to roughen the surface of the record for writing thereon.

The unique aspects of the present invention are further illustrated by the following comparative data:

A photographic material prepared in accordance with Example I (and designated film I) was exposed to ultraviolet light and developed by heating to 280° F. for 10 seconds. A second record forming material was made up as in Example I, except that the chrome complex was omitted. Film II was exposed and developed in a manner identical with the exposure and development of film I.

The two scatter records made up as described above were then tested for durability by subjecting them to an atmosphere of 150° F. and 95% relative humidity. The scatter record form with film II disappeared in less than 15 minutes. In contrast, the record formed in film I showed little loss in optical density even after 24 hours storage at 150° F., 95% relative humidity.

The temperature and time conditions used for development can be rather widely varied. These conditions are interrelated as illustrated by the temperature-time curve shown in the accompanying drawing. The nature of the curve, which is based on the product of Example I, indicates that development involves a chemical reaction as distinguished from a purely surface treatment. Irreversible setting of the film is also indicated when the time-temperature conditions of the drawing are followed since the product is incapable of producing further scatter record in a second exposure and development.

It will be appreciated that various modifications may be made in the invention described herein without deviating from the scope thereof as defined in the appended claims wherein we claim:

1. Photographic materials for use in the preparation of an image record in terms of light scattering discontinuities, said materials comprising a film of organic normally hydrophilic colloid selected from the group consisting of gelatin, zein and polyvinyl alcohol having a pH not in excess of about 5 and substantially uniformly dispersed therein (1) a light decomposable solid agent, which is non-reactive to said colloid and which, upon exposure, decomposes into products which are chemically non-reactive to said colloid and which on warming are volatile to form said light scattering discontinuities only in the light exposed areas of said colloid to thereby develop said record, and (2) a chrome carboxylic acid complex of the Werner type in which a trivalent nuclear chromic atom is coordinated with a carboxylic acid group, said complex being essentially unaffected by exposure to light, but chemically reactive to said colloid upon heating to effectively stabilize said record.

2. Photographic material as claimed in claim 1 wherein said colloid is gelatin and said light decomposable agent is a diazonium salt.

3. Photographic material as claimed in claim 1, including by weight from about 0.5 to 1.5 parts of said light decomposable agent and from about 0.5 to 3 parts, of said complex per 10 parts of colloid.

4. Photographic material as claimed in claim 1 wherein said film is coated on a non-metallic photographic support.

5. Photographic material as claimed in claim 1 wherein said chrome complex is stearato chromic chloride.

6. Photographic material as claimed in claim 1 wherein said chrome complex is laurylato chromic chloride.

7. Photographic material as claimed in claim 1 wherein said chrome complex is propionato chromic chloride.

8. Photographic material as claimed in claim 1 including a water-soluble, partially condensed urea-formaldehyde resin.

9. Photographic material as claimed in claim 3, including about 0.1 to .75 part of a water-soluble, partially condensed urea-formaldehyde resin per 10 parts of colloid.

10. A process for making a material suitable for use in the preparation of an image record in terms of light scattering discontinuities comprising the steps of (1) adjusting the pH of an organic, normally hydrophilic colloid selected from the group consisting of gelatin, zein and polyvinyl alcohol to not greater than about 5, (2) mixing the thus treated colloid with a light decomposable solid agent which is non-reactive to said colloid and which upon exposure decomposes into products which are chemically non-reactive to said colloid and which on warming are volatile to form light scattering discontinuities only in the areas of said structure by light to thereby develop a record, and (3) compounding the resulting mixture with a chrome carboxylic acid complex of the Werner type in which a trivalent nuclear chromic atom is coordinated with a carboxylic acid group, said complex being essentially non-reactive to said colloid upon heating to effectively stabilize said record.

11. The process of claim 10, including the further steps of coating the compounded mixture of step (3) on a non-metallic photographic support and drying the thus coated support.

12. The process of claim 10, wherein said colloid comprises an aqueous solution of gelatin and the pH thereof is adjusted with a mineral acid.

13. The process of claim 12, wherein said aqueous solution comprises 10 parts of gelatin in from 50 to 70 parts water.

14. The process of claim 10, wherein from about 0.5 to 1.5 parts of said light decomposable solid agent and from about 0.5 to 3 parts of said complex, by weight, are mixed with 10 parts of said colloid.

15. The process of claim 14, wherein the pH of said colloid is adjusted to between 2.5 and 3.

16. The process of claim 12, wherein said complex is added to the mixture of gelatin and light decomposable solid agent in the form of an alcohol-water solution.

17. The process of claim 10, wherein a water-soluble, partially condensed urea-formaldehyde resin is added.

References Cited in the file of this patent

UNITED STATES PATENTS

| 2,356,161 | Iler | Aug. 22, 1944 |
| 2,699,392 | Herrick et al. | Jan. 11, 1955 |
| 2,709,654 | Guth | May 31, 1955 |
| 2,764,085 | Shoemaker et al. | Sept. 25, 1956 |

FOREIGN PATENTS

| 402,737 | Great Britain | Mar. 5, 1932 |
| 645,825 | Great Britain | Nov. 8, 1950 |